UNITED STATES PATENT OFFICE.

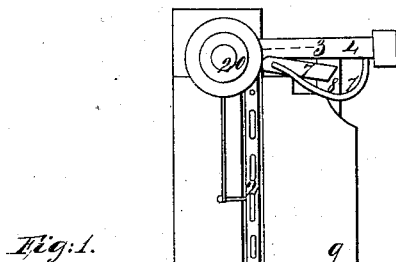
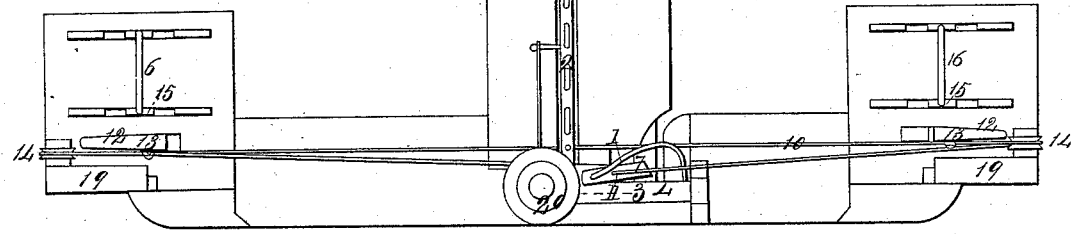
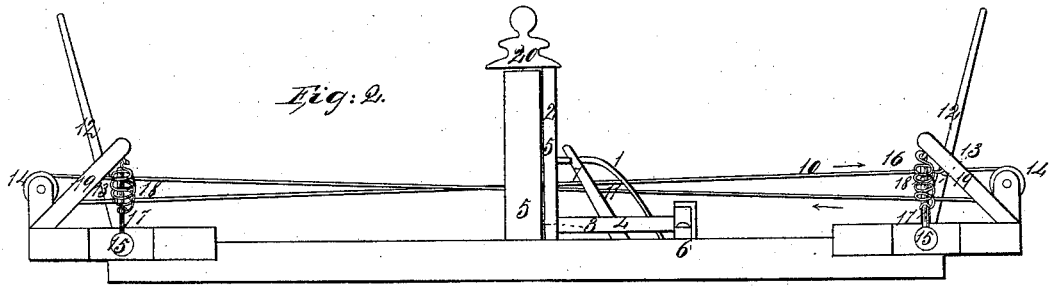
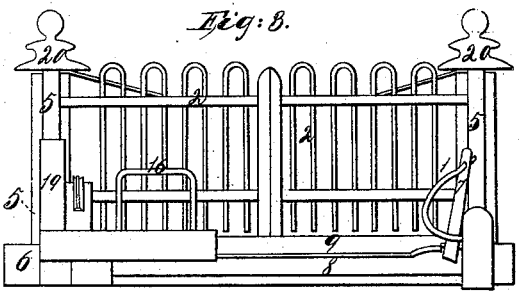

W. T. COLE, OF REED, OHIO.

IMPROVED APPROACH-OPENING GATE.

Specification forming part of Letters Patent No. 33,338, dated September 24, 1861.

*To all whom it may concern:*

Be it known that I, W. T. COLE, of Reed, in the county of Seneca and State of Ohio, have invented a new and Improved Approach-Opening Gate, the construction and operation of which I have described in the following specification and illustrated in its accompanying drawings with sufficient clearness to enable competent and skillful workmen in the arts to which it pertains or is most nearly allied to make and use my invention.

My invention consists in the combination of a cam constructed in the form and arranged in the manner hereinafter set forth, with a gate hung on a horizontal axis, so that it may be thrown up out of the way when opened by the operation of the cam, and with the levers and connections necessary for operating the same.

In the drawings by which this specification is accompanied, Figure 1 is a plan of my invention, showing the two parts of the gate shut. Fig. 2 is a side elevation of the same. Fig. 3 is an end elevation of the same. Fig. 4 is a vertical transverse section of one of the gate-posts, showing the counterpoise for the gate and the line by which it is attached to the same.

In the several figures, 1 is the cam by which the gate is thrown up and outward to open it.

2 is the gate, which is hinged at 3 on the axis 4. This axis is boxed or set into the post 5 and on the timber 6 and turns freely. The slides which work on the cam 1 are shown at 7 7. These are connected to the shaft 8, which runs under the plank 9 and reaches the full width of the gate, one end having a journal in the timber 6, and the other in another piece of timber similar to the timber 6 and at the other side of the road.

10 is an endless chain, belt, or line fastened to the slides 7 7 at the points 11 11 and to the levers 12 12 at the points 13 13, passing around the pulleys 14 14. The levers 12 12 are set into or fastened to shafts 15 15, which form hinges or joints for the said levers to turn on. To the shafts 15 15 are attached two smaller levers 16 16 and two arms 17 17, to which springs 18 18 are attached at the end farthest from the shafts 15 15. These springs are attached to supports 19 19, by which they are upheld. The supporters 19 19 are firmly fastened to the timbers 6.

For convenience in opening the gate I fasten the caps 20 20 to the gate instead of to the posts 5 5, as is ordinarily done.

In Fig. 4 is shown the counterpoise 21 hung inside of the post, or more properly box 5, being attached to the chain or line 22, which is in its turn (after passing over the rollers 23 23, which reduce the friction) fastened to the gate. The springs 18 18, combined with the arms 17 17 and supporters 19 19, keep the shaft (when not forced around by the pressure of a wheel on the levers 16 16 or of a hand on the levers 12 12) in a particular position, that in which the arms or levers 16 16 are perpendicular. Thus they are in the best position to be operated on by the wheel of any approaching vehicle.

The operation of my gate is as follows: The gate or gates being shut and the levers 16 16 in a perpendicular position and all the other parts adjusted, the lever 16 at the end toward which the vehicle approaches is forced down toward the gate by the pressure of the wheel. This by means of the shaft 15 throws the lever 12 (and with it the chain or line 10, which is fastened to the said lever 12 at the point 13) down toward the gate 2. This motion of the upper section of the cord or chain 10 causes a reverse motion in the lower section or part of said chain, which, being connected to the slide 7, draws it in the direction from the gate, and the said slide being firmly mortised into the shaft 8, so that it cannot move laterally, forces the gate upward and outward, (by means of the cam 1,) turning it on the axis 4. The shaft 8 reaching through under the road to the other side, and the slide 7 on that side of the road being firmly mortised into the said shaft, the said slide must move with the shaft, thus opening the gate on that side in the same way in which the other gate was opened. The vehicle passing through the gate strikes the lever 16, forcing it from the gate, which by means of the shaft 15, chain 10, slide 7, cam 1, and shaft 8 shuts the gate, the operation being the reverse of that which opened it. If it is a pedestrian or person on horseback who wishes to pass through, or if the wheel of the vehicle misses the lever 16, by pressing on the lever 12 with the hand the opening of the gate is accomplished as easily and quickly as by the operation of the wheel on the lever 16. The counterpoise (shown at 27 in Fig. 4) is for the purpose of balancing as nearly as possible the weight of the gate on the axis 4, so that it will take but little power applied to either of the levers 12 12 or 16 16 to open or shut the gate. Although the gates are thus balanced, yet there is no liability of their being opened by cattle or hogs, as the cams 11 hold them firmly in whatever place they may occupy, except when the levers 12 or 16 are worked.

Having thus fully described my invention, I claim—

The combination of the cams 1 1 with the slides 7 7 and the shaft 8 and the gate or gates 2 2, when combined and operated substantially as set forth.

W. T. COLE.

Witnesses:
 EDWARD COLE,
 CHAS. W. STOWE.